United States Patent
Ise et al.

(10) Patent No.: US 11,297,863 B2
(45) Date of Patent: *Apr. 12, 2022

(54) EMULSIFIED SEASONING

(71) Applicant: KAO CORPORATION, Tokyo (JP)

(72) Inventors: Akihiro Ise, Koganei (JP); Tomoya Tsukamoto, Kawasaki (JP)

(73) Assignee: KAO CORPORATION, Tokyo (JP)

(*) Notice: Subject to any disclaimer, the term of this patent is extended or adjusted under 35 U.S.C. 154(b) by 31 days.

This patent is subject to a terminal disclaimer.

(21) Appl. No.: 16/095,211

(22) PCT Filed: Apr. 19, 2017

(86) PCT No.: PCT/JP2017/015656
§ 371 (c)(1),
(2) Date: Oct. 19, 2018

(87) PCT Pub. No.: WO2017/183650
PCT Pub. Date: Oct. 26, 2017

(65) Prior Publication Data
US 2019/0133168 A1    May 9, 2019

(30) Foreign Application Priority Data

Apr. 20, 2016  (JP) .............................. JP2016-084768

(51) Int. Cl.
*A23L 27/60* (2016.01)
*A23D 7/005* (2006.01)

(52) U.S. Cl.
CPC ............. *A23L 27/60* (2016.08); *A23D 7/005* (2013.01); *A23V 2002/00* (2013.01)

(58) Field of Classification Search
CPC ...... A23D 7/005; A23L 27/60; A23V 2002/00
See application file for complete search history.

(56) References Cited

U.S. PATENT DOCUMENTS

| | | | |
|---|---|---|---|
| 2015/0159117 A1 | 6/2015 | Kano et al. | |
| 2015/0216779 A1 | 8/2015 | Mora-Gutierrez | |
| 2016/0165914 A1 | 6/2016 | Matsuda et al. | |
| 2016/0255852 A1* | 9/2016 | Kato | ........................ A23G 1/48 |

FOREIGN PATENT DOCUMENTS

| | | | | |
|---|---|---|---|---|
| CA | 2 930 510 A1 | 5/2015 | | |
| CN | 104470373 A | 3/2015 | | |
| CN | 104911027 A | 9/2015 | | |
| CN | 105228460 A | 1/2016 | | |
| CN | 105636450 A | 6/2016 | | |
| EP | 1 842 429 A2 | 10/2007 | | |
| JP | 9-176679 A | 7/1997 | | |
| JP | 11-228838 A | 8/1999 | | |
| JP | 2004-204212 A | 7/2004 | | |
| JP | 2007-185138 A | 7/2007 | | |
| JP | 2007325513 A | * | 12/2007 | |
| JP | 2010-162049 A | 7/2010 | | |
| JP | 2010-535526 A | 11/2010 | | |
| JP | 2013-159730 A | 8/2013 | | |
| JP | 2013159730 A | * | 8/2013 | |
| JP | 2013-209436 | 10/2013 | | |
| JP | 5414908 B2 | * | 2/2014 | ............. A23L 27/60 |
| JP | 2015-2740 A | 1/2015 | | |
| JP | 2015-97486 A | 5/2015 | | |
| WO | WO-2012037630 A1 | * | 3/2012 | ........... A23D 7/0053 |
| WO | WO 2013/172348 A1 | 11/2013 | | |
| WO | WO 2015/072406 A1 | 5/2015 | | |
| WO | WO 2015/095545 A1 | 6/2015 | | |
| WO | WO-2015095545 A1 | * | 6/2015 | ............. A23L 33/115 |

OTHER PUBLICATIONS

International Search Report dated Jul. 25, 2017, in PCT/JP2017/015656, filed Apr. 19, 2017.
Kido, H. "Rosemary Extract—Need to Extend Shelf of Life in Foods-", Oleoscience, vol. 4, No. 10, 2004, pp. 11-17 (with partial English translation), 9 pages total.
Koga, T. et al., "Effect of Beef Plasma Protein on Quality of Emulsion Type Salad Dressing Preparation", Journal of the Japanese Society for Food Science and Technology, vol. 49, No. 2, 2002, pp. 82-90 (with partial English translation), 10 pages total.
Extended European Search Report dated Sep. 2, 2019, in Patent Application No. 17785988.1, 14 pages.
Abd El-Baky, H. H. et al., "Production of antioxidant by the green alga *Dunaliella salina*", International Journal of Agriculture & Biology, XP055613843, vol. 6, No. 1 Jul. 4, 2014, 10 pages.
Liu, et al., Progress on Research of Natural Rosemary Antioxidant, Chemistry and Industry of Forest Products, vol. 24 Supplement, Aug. 2004, pp. 132-138 (including English abstract in p. 132).

* cited by examiner

*Primary Examiner* — Latosha Hines
(74) *Attorney, Agent, or Firm* — Oblon, McClelland, Maier & Neustadt, L.L.P.

(57) ABSTRACT

Provided is an emulsified liquid seasoning in which degradation of taste and flavor with the storage is suppressed. An emulsified liquid seasoning comprising the following components (A), (B), and (C) blended therein: (A) ω3 fatty acids derived from a fat or oil, in an amount of 3 to 20% by mass; (B) rosmarinic acid; and (C) reduced glutathione, wherein (D) a phospholipid is blended in an amount of 0.4% by mass or less into the emulsified liquid seasoning.

22 Claims, No Drawings

EMULSIFIED SEASONING

FIELD OF THE INVENTION

The present invention relates to an emulsified liquid seasoning.

BACKGROUND ART OF THE INVENTION

In recent years, interest in health has increased, and attention has been focused on the physiological functions of polyunsaturated fatty acids (hereinafter, referred to as "PUFA") typified by ω3 fatty acids.

PUFA have many unsaturated bonds, and therefore PUFA-rich fats or oils have low stability particularly to heat and light and easily generate a bad odor. Therefore, usually, antioxidants are contained in fats or oils to prevent the deterioration of taste and flavor of the fats or oils during storage.

As antioxidants for fats or oils, tocopherol, ascorbic acid, ascorbic acid fatty acid esters, lecithin, and the like are widely used. For example, Patent Literature 1 discloses a composition comprising an LC-PUFA-containing oil and lecithin in which lecithin is added in a weight ratio of lecithin to LC-PUFA of at least about 25:75.

In addition, rosemary extract is also known to have high antioxidant properties, and for example, a lipophilic antioxidant containing bayberry extract, rosemary extract, and the like (Patent Literature 2), and an antioxidant comprising rosemary extract in which the amount of hexanal and also the amounts of carnosol and carnosic acid as antioxidant components are adjusted (Patent Literature 3) are reported.

Meanwhile, glutathione is a tripeptide present in vivo and is known to be involved in antioxidation in cells and the detoxification of cells. Regarding use for edible fats or oils, an oil-soluble antioxidant obtained by treating a water-soluble antioxidant component such as glutathione or a catechin with hydrophilic and lipophilic emulsifiers to form an emulsion (Patent Literature 4) is reported.

(Patent Literature 1) JP-A-2010-535526
(Patent Literature 2) JP-A-2007-185138
(Patent Literature 3) JP-A-2004-204212
(Patent Literature 4) JP-A-2013-159730

SUMMARY OF THE INVENTION

The present invention provides an emulsified liquid seasoning comprising the following components (A), (B), and (C) blended therein:
(A) ω3 fatty acids derived from a fat or oil, in an amount of 3 to 20% by mass;
(B) rosmarinic acid; and
(C) reduced glutathione,
wherein (D) a phospholipid is blended in an amount of 0.4% by mass or less in the emulsified liquid seasoning.

In addition, the present invention provides a method for producing an emulsified liquid seasoning, comprising a step of blending (A) ω3 fatty acids derived from a fat or oil, (B) rosmarinic acid, and (C) reduced glutathione, and (D) phospholipid as needed, wherein
an amount of the component (A) blended is from 3 to 20% by mass based on a total mass of all raw materials blended, and an amount of the component (D) blended is 0.4% by mass or less based on the total mass of all the raw materials blended.

DETAILED DESCRIPTION OF THE INVENTION

However, particularly in an emulsified liquid seasoning comprising an oil-in-water emulsion using an ω3 fatty acid-rich fat or oil as an oil phase, the oxidation of the fat or oil is likely to be promoted over time by oxygen in air and by the presence of the aqueous phase, and the retention of taste and flavor during storage is not sufficient even by the conventional methods.

Therefore, the present invention provides an emulsified liquid seasoning in which the degradation of taste and flavor with the storage is suppressed.

The present inventors produced emulsified liquid seasonings in which ω3 fatty acid-rich fats or oils are blended, and studied their taste and flavor retention. As a result, they found that when rosmarinic acid and reduced glutathione are blended, the deterioration of the taste and flavor of the emulsified liquid seasoning over time can be suppressed. In addition, the present inventors found that when a large amount of a phospholipid is blended in an emulsified liquid seasoning, it is difficult to achieve viscosity suitable for the use of the seasoning, and that surprisingly, the deterioration of the emulsified liquid seasoning is likely to proceed to generate a deterioration odor and a foreign odor. Under these circumstances, the present inventors found that when the amount of the phospholipid blended is reduced to a certain amount or less, an emulsified liquid seasoning having a good taste and flavor even after storage is obtained.

According to the present invention, it provides an emulsified liquid seasoning which is excellent in storability, has a good taste and flavor, and is easy to use while comprising a large amount of ω3 fatty acids.

The emulsified liquid seasoning of the present invention is a liquid seasoning comprising an oil-in-water emulsion in which an oil is emulsified and dispersed in water.

(A) ω3 fatty acids derived from a fat or oil are blended in the emulsified liquid seasoning of the present invention. Examples of the ω3 fatty acids include α-linolenic acid (ALA, C18:3), eicosapentaenoic acid (EPA, C20:5), and docosahexaenoic acid (DHA, C22:6). The ω3 fatty acids may be used alone, or as a combination of two or more.

In the emulsified liquid seasoning of the present invention, the amount blended of (A) the ω3 fatty acids derived from the fat or oil is from 3 to 20% by mass. The amount blended of (A) the ω3 fatty acids derived from the fat or oil depends on the type of ω3 fatty acids, and is more preferably 4% by mass (hereinafter described as "%") or more, more preferably 5% or more, more preferably 7% or more, and even more preferably 10% or more in terms of physiological effects and more preferably 19% or less, more preferably 18% or less, more preferably 16% or less, and even more preferably 13% or less in terms of a suitable intake of lipids.

In the emulsified liquid seasoning, the amount blended of (A) the ω3 fatty acids derived from the fat or oil is more preferably from 4 to 19%, more preferably from 5 to 18%, more preferably from 7 to 16%, and even more preferably from 10 to 13%.

When the emulsified liquid seasoning contains (A1) eicosapentaenoic acid and docosahexaenoic acid derived from a fat or oil, the amount blended of (A) the ω3 fatty acids derived from the fat or oil, in the emulsified liquid seasoning, is preferably 10% or less, more preferably 8% or less, more preferably 6% or less, more preferably 5% or less, and more preferably 4% or less in terms of suppressing a fishy odor.

When the emulsified liquid seasoning contains (A1) eicosapentaenoic acid and docosahexaenoic acid derived from the fat or oil, the amount blended of (A) the ω3 fatty acids derived from the fat or oil, in the emulsified liquid seasoning, is preferably from 3 to 16%, more preferably from 3 to 10%, more preferably from 3 to 8%, more preferably from 3 to 6%, more preferably from 3 to 5%, and more preferably from 3 to 4%.

When the emulsified liquid seasoning does not contain (A1) eicosapentaenoic acid and docosahexaenoic acid derived from the fat or oil, the amount blended of (A) the ω3 fatty acids derived from the fat or oil, in the emulsified liquid seasoning, are preferably 11% or less and more preferably 10% or less in terms of suppressing a deterioration odor derived from linseed (flaxseed) oil.

When the emulsified liquid seasoning does not contain (A1) eicosapentaenoic acid and docosahexaenoic acid derived from the fat or oil, the amount blended of (A) the ω3 fatty acids derived from the fat or oil, in the emulsified liquid seasoning, is preferably from 3 to 18%, more preferably from 3 to 13%, more preferably from 3 to 11%, more preferably from 4 to 11%, and more preferably from 4 to 10%.

The amount blended in the emulsified liquid seasoning herein refers to the amount incorporated (added) in the emulsified liquid seasoning, which is the content based on the total amount of the emulsified liquid seasoning in which the oil phase and the aqueous phase are combined.

When the emulsified liquid seasoning contains (A1) eicosapentaenoic acid and docosahexaenoic acid derived from the fat or oil, and (A2) α-linolenic acid derived from a fat or oil, the total amount blended of (A1) eicosapentaenoic acid and docosahexaenoic acid derived from the fat or oil, in the emulsified liquid seasoning, is preferably 0.1% or more, more preferably 0.5% or more, more preferably 1% or more, more preferably 2% or more, and more preferably 3% or more in terms of physiological effects and preferably 8% or less, more preferably 7.5% or less, more preferably 7% or less, more preferably 6% or less, more preferably 5% or less, more preferably 4% or less, more preferably 3% or less, more preferably 2% or less, and more preferably 1.5% or less in terms of suppression in fishy odor.

When the emulsified liquid seasoning contains (A1) eicosapentaenoic acid and docosahexaenoic acid derived from the fat or oil, and (A2) α-linolenic acid derived from the fat or oil, the total amount blended of (A1) eicosapentaenoic acid and docosahexaenoic acid derived from the fat or oil, in the emulsified liquid seasoning, is preferably from 0.1 to 8%, more preferably from 0.5 to 7.5%, more preferably from 0.5 to 7%, more preferably from 0.5 to 6%, more preferably from 0.5 to 5%, more preferably from 0.5 to 4%, more preferably from 0.5 to 3%, more preferably from 0.5 to 2%, and more preferably from 0.5 to 1.5%.

When the emulsified liquid seasoning contains (A1) eicosapentaenoic acid and docosahexaenoic acid derived from the fat or oil, and (A2) α-linolenic acid derived from the fat or oil, the amount blended of (A2) α-linolenic acid derived from the fat or oil, in the emulsified liquid seasoning, is preferably 0.1% or more, more preferably 0.5% or more, more preferably 1% or more, and more preferably 2% or more in terms of physiological effects and preferably 8% or less, more preferably 6% or less, and more preferably 4% or less in terms of suppression in fishy odor and the suppression in a deterioration odor derived from linseed (flaxseed) oil.

When the emulsified liquid seasoning contains (A1) eicosapentaenoic acid and docosahexaenoic acid derived from the fat or oil, and (A2) α-linolenic acid derived from the fat or oil, the amount blended of (A2) α-linolenic acid derived from the fat or oil, in the emulsified liquid seasoning, is preferably from 0.1 to 8%, more preferably from 0.5 to 6%, more preferably from 1 to 4%, and more preferably from 2 to 4%.

The amount blended of (A2) α-linolenic acid derived from the fat or oil, in the emulsified liquid seasoning not containing (A1) eicosapentaenoic acid and docosahexaenoic acid derived from the fat or oil, is preferably 0.1% or more, more preferably 0.5% or more, more preferably 1% or more, more preferably 3% or more, and more preferably 7% or more in terms of physiological effects and preferably 20% or less, more preferably 19.5% or less, more preferably 19% or less, more preferably 17% or less, more preferably 13% or less, and more preferably 11% or less in terms of the suppression in a deterioration odor derived from linseed (flaxseed) oil.

The amount blended of (A2) α-linolenic acid derived from the fat or oil, in the emulsified liquid seasoning not containing (A1) eicosapentaenoic acid and docosahexaenoic acid derived from the fat or oil, is preferably from 0.1 to 20%, more preferably from 0.5 to 19.5%, more preferably from 1 to 19%, more preferably from 3 to 17%, more preferably from 3 to 13%, and more preferably from 3 to 11%.

Preferably, (A) the ω3 fatty acids derived from the fat or oil are blended in the emulsified liquid seasoning as a fatty acid constituting the fat or oil.

The amount blended of the fat or oil in the emulsified liquid seasoning is preferably 10% or more, more preferably 20% or more, and more preferably 25% or more in view of seasoning and preferably 60% or less, more preferably 50% or less, and more preferably 40% or less in terms of a suitable intake of lipids.

The amount of the fat or oil blended in the emulsified liquid seasoning is preferably from 10 to 60%, more preferably from 20 to 50%, and more preferably from 25 to 40%.

Such a fat or oil is used as an oil phase component of the emulsified liquid seasoning.

The fatty acids constituting the fat or oil, other than the ω3 fatty acids, are not particularly limited and may be saturated fatty acids or unsaturated fatty acids. In terms of appearance, preferably 60% or more, more preferably 70% or more, more preferably 75% or more, and more preferably 80% or more of the constituent fatty acids are unsaturated fatty acids, and in terms of the industrial productivity of the fat or oil, preferably 100% or less, more preferably 99% or less, and more preferably 98% or less of the constituent fatty acids are unsaturated fatty acids. The content of the unsaturated fatty acids in the fatty acids constituting the fat or oil is preferably from 60 to 100%, more preferably from 70 to 100%, more preferably from 75 to 99%, and more preferably from 80 to 98%. The number of carbon atoms of the unsaturated fatty acid is preferably from 14 to 24 and more preferably from 16 to 22 in terms of physiological effects.

The content of saturated fatty acids in the fatty acids constituting the fat or oil is preferably 40% or less, more preferably 30% or less, more preferably 25% or less, and even more preferably 20% or less in terms of appearance and physiological effects. The content of the saturated fatty acids in the fatty acids constituting the fat or oil is preferably 0.5% or more in terms of the industrial productivity of the fat or oil. As the saturated fatty acids, those having from 14 to 24 carbon atoms are preferred, and those having from 16 to 22 carbon atoms are further preferred.

The substances constituting the fat or oil in the present invention include not only triacylglycerol but also monoacylglycerol and diacylglycerol. In other words, in the present invention, the fat or oil comprises any one or more of monoacylglycerol, diacylglycerol, and triacylglycerol.

The content of triacylglycerol in the fat or oil is preferably from 78 to 100%, more preferably from 88 to 100%, more preferably from 90 to 99.5%, and more preferably from 92 to 99% in terms of the industrial productivity of the fat or oil.

The content of diacylglycerol in the fat or oil is preferably 19% or less, and more preferably 9% or less, more preferably 0.1 to 7%, and more preferably 0.2 to 5% in terms of the industrial productivity of the fat or oil. The content of monoacylglycerol in the fat or oil is preferably 3% or less and more preferably from 0 to 2% in terms of making the taste and flavor good.

The content of free fatty acids or salts thereof contained in the fat or oil is preferably 5% or less, and more preferably from 0 to 2% and more preferably from 0 to 1% in terms of taste and flavor and the industrial productivity of the fat or oil.

The fat or oil in the present invention is not particularly limited as long as it can be used as an edible fat or oil. Examples of the fat or oil in the present invention can include fats or oils such as vegetable fats or oils such as soybean oil, rapeseed oil, safflower oil, rice oil, corn oil, sunflower oil, cottonseed oil, olive oil, sesame oil, peanut oil, adlay oil, wheat germ oil, perilla oil, linseed (flaxseed) oil, sacha inchi oil, walnut oil, kiwi fruit seed oil, salvia seed oil, grape seed oil, macadamia nut oil, hazelnut oil, pumpkin seed oil, camellia oil, tea seed oil, borage oil, palm oil, palm olein, palm stearin, coconut oil, palm kernel oil, cacao butter, sal butter, shea butter, and algae oil; animal fats or oils such as fish oil, lard, beef tallow, and butterfat; or transesterified oils, hydrogenated oils, and fractionated oils thereof. The edible fats or oils are preferably refined fats or oils which have undergone a refining step.

These oils may each be used singly or may be appropriately mixed and used. Among them, a liquid fat or oil excellent in low temperature resistance is preferably used in terms of usability, and one or more selected from the group consisting of vegetable oils such as soybean oil, rapeseed oil, safflower oil, corn oil, sunflower oil, cottonseed oil, olive oil, sesame oil, peanut oil, adlay oil, wheat germ oil, perilla oil, and linseed (flaxseed) oil, algae oil, and fish oil are more preferably used.

Further, for the fat or oil, one or more selected from the group consisting of linseed oil (flaxseed), perilla oil, algae oil, and fish oil and one or more selected from the group consisting of soybean oil, rapeseed oil, safflower oil, corn oil, sunflower oil, cottonseed oil, olive oil, and sesame oil are preferably mixed and used.

The proportion of one or more fats or oils selected from the group consisting of linseed (flaxseed) oil, perilla oil, algae oil, and fish oil is preferably 0.1 to 100% in the total amount of fats or oils.

The fish oil is an aquatic animal fat or oil and can be extracted from a raw material, for example, a sardine, a herring, a saury, a mackerel, a tuna, a squid, or a cod liver. The algae oil can be extracted from algae belonging to Chlorophyceae, Bacillariophyceae, or the like. The liquid fat or oil refers to a fat or oil which is liquid at 20° C. when subjected to the cooling test in accordance with the JOCS Standard Methods for the Analysis of Fats, Oils and Related Materials, 2.3.8-27.

(B) rosmarinic acid blended in the emulsified liquid seasoning of the present invention is a compound of the chemical name (R)-2-[(E)-3-(3,4-dihydroxyphenyl)-1-oxo-2-propenyloxy]-3-(3,4-dihydroxyphenyl)propanoic acid represented by the molecular formula $C_{18}H_{16}O_8$ and is one of phenolic acids contained in labiates such as rosemary. For (B) rosmarinic acid blended in the emulsified liquid seasoning of the present invention, an extract extracted from rosemary or lemon balm by an extraction method is preferably used.

The amount of (B) rosmarinic acid blended in the emulsified liquid seasoning of the present invention is preferably 1 ppm (parts per million by mass) or more, more preferably 10 ppm or more, more preferably 50 ppm or more, and more preferably 100 ppm or more in view of the suppression in flavor deterioration (a fishy odor, and a deterioration odor derived from linseed (flaxseed) oil) with the storage and preferably 400 ppm or less, more preferably 390 ppm or less, more preferably 350 ppm or less, more preferably 300 ppm or less, and more preferably 250 ppm or less in terms of herb-like odor suppression.

The amount of (B) rosmarinic acid blended in the emulsified liquid seasoning is preferably from 1 to 400 ppm, more preferably from 10 to 390 ppm, more preferably from 50 to 350 ppm, more preferably from 100 to 300 ppm, and more preferably from 100 to 250 ppm.

When the emulsified liquid seasoning of the present invention contains eicosapentaenoic acid and docosahexaenoic acid as the (A) component, the amount of (B) rosmarinic acid blended is preferably 1 ppm (parts per million by mass) or more, more preferably 10 ppm or more, more preferably 50 ppm or more, and more preferably 100 ppm or more in view of the suppression in flavor deterioration with the storage and preferably 400 ppm or less, more preferably 390 ppm or less, more preferably 350 ppm or less, more preferably 300 ppm or less, more. preferably 250 ppm or less, more preferably 200 ppm or less, and more preferably 150 ppm or less in terms of herb-like odor suppression.

The amount of (B) rosmarinic acid blended in the emulsified liquid seasoning containing eicosapentaenoic acid and docosahexaenoic acid as the (A) component is preferably from 1 to 400 ppm, more preferably from 10 to 390 ppm, more preferably from 50 to 350 ppm, more preferably from 50 to 250 ppm, more preferably from 50 to 200 ppm, more preferably from 50 to 150 ppm, and more preferably from 100 to 150 ppm.

When the emulsified liquid seasoning of the present invention does not contain eicosapentaenoic acid and docosahexaenoic acid as the (A) component, the amount of (B) rosmarinic acid blended is preferably 1 ppm (parts per million by mass) or more, more preferably 10 ppm or more, more preferably 50 ppm or more, and more preferably 100 ppm or more in view of the suppression in flavor deterioration with the storage and preferably 400 ppm or less, more preferably 300 ppm or less, more preferably 200 ppm or less, and more preferably 150 ppm or less in terms of herb-like odor suppression.

The amount of (B) rosmarinic acid blended in the liquid seasoning not containing eicosapentaenoic acid and docosahexaenoic acid as the (A) component is preferably from 1 to 400 ppm, more preferably from 10 to 300 ppm, more preferably from 50 to 200 ppm, and more preferably from 100 to 150 ppm.

Carnosic acid, carnosol, or a combination thereof may be further blended in the emulsified liquid seasoning of the present invention. Carnosic acid and carnosol, are components classified in labiates such as rosemary and sage, like (B) rosmarinic acid, and extracts extracted from plants by extraction methods may be used. Carnosic acid and carnosol are preferably blended in the oil phase of the emulsified liquid seasoning.

The amount of carnosic acid, carnosol, or the combination thereof blended in the emulsified liquid seasoning of the present invention is preferably from 0.1 to 40 ppm and more preferably from 10 to 30 ppm in view of the suppression in flavor deterioration with the storage. As the method for analyzing carnosic acid and carnosol, high performance liquid chromatography (HPLC) may be used.

Glutathione is a tripeptide comprising glutamic acid, cysteine, and glycine (N-(N-L-γ-glutamyl-L-cysteinyl)glycine) and is known to be present as the reduced form (GSH) and the oxidized form (GSSG).

(C) reduced glutathione (GSH) for blending in the emulsified liquid seasoning of the present invention can be obtained by a known production method, for example, any of a synthesis method, an enzymatic method, or an extraction method (see BIO INDUSTRY vol 27, No. 8 (2010)). For food applications, an extraction method is preferred. Examples of the extraction method include a method involving adding a slight amount of zinc to a *Saccharomyces* yeast (see JP-A-1-141591), and a method involving using a yeast having cadmium resistance or macrolide antibiotic resistance (JP-A-2006-42637 and JP-A-2006-42638). By these, yeast extracts highly containing glutathione are obtained. When oxidized glutathione (GSSG) is contained in the obtained yeast extract, it may be converted into reduced glutathione by a reduction reaction (JP-A-2007-254325, JP-A-2007-254324, and JP-A-2007-277109).

The amount of (C) reduced glutathione blended in the emulsified liquid seasoning of the present invention is preferably 0.1 ppm or more, more preferably 0.5 ppm or more, more preferably 1 ppm or more, more preferably 3 ppm or more, and more preferably 5 ppm or more in view of the suppression in flavor deterioration with the storage and preferably 30 ppm or less, more preferably 20 ppm or less, more preferably 18 ppm or less, more preferably 15 ppm or less, and more preferably 12 ppm or less in terms of a lasting feeling of aftertaste.

The amount of (C) reduced glutathione blended in the emulsified liquid seasoning is preferably from 0.1 to 30 ppm, more preferably from 0.5 to 20 ppm, more preferably from 1 to 18 ppm, more preferably from 3 to 15 ppm, and more preferably from 5 to 12 ppm.

The analysis of the components (B) and (C) herein follows methods described in Examples below.

When eicosapentaenoic acid and docosahexaenoic acid are contained as the (A) component in the emulsified liquid seasoning of the present invention, a mass ratio of the total amount of (B) rosmarinic acid and (C) reduced glutathione blended in the emulsified liquid seasoning to the amount blended of (A) the ω3 fatty acids derived from the fat or oil, in the emulsified liquid seasoning, $[\{(B)+(C)\}/(A)]$, depends on the type of ω3 fatty acids to be used, and is preferably $1\times10^{-4}$ or more, more preferably $5\times10^{-4}$ or more, more preferably $15\times10^{-4}$ or more, and more preferably $25\times10^{-4}$ or more in view of the suppression in flavor deterioration with the storage and preferably $100\times10^{-4}$ or less, more preferably $70\times10^{-4}$ or less, more preferably $50\times10^{-4}$ or less, and more preferably $35\times10^{-4}$ or less in terms of a herb-like odor and a lasting feeling of aftertaste.

Such a mass ratio, $[\{(B)+(C)\}/(A)]$, is preferably in the range of from $1\times10^{-4}$ to $100\times10^{-4}$, more preferably in the range of from $5\times10^{-4}$ to $70\times10^{-4}$, more preferably in the range of from $15\times10^{-4}$ to $50\times10^{-4}$, and more preferably in the range of from $25\times10^{-4}$ to $35\times10^{-4}$.

A mass ratio of the total amount of (B) rosmarinic acid and (C) reduced glutathione blended in the emulsified liquid seasoning to the total amount blended of (A1) eicosapentaenoic acid and docosahexaenoic acid derived from the fat or oil, in the emulsified liquid seasoning, $[\{(B)+(C)\}/(A1)]$, is preferably $5\times10^{-4}$ or more, more preferably $15\times10^{-4}$ or more, more preferably $70\times10^{-4}$ or more, and more preferably $85\times10^{-4}$ or more and preferably $300\times10^{-4}$ or less, more preferably $200\times10^{-4}$ or less, more preferably $150\times10^{-4}$ or less, and more preferably $100\times10^{-4}$ or less from the same point of view as mentioned above.

Such a mass ratio, $[\{(B)+(C)\}/(A1)]$, is preferably in the range of from $5\times10^{-4}$ to $300\times10^{-4}$, more preferably in the range of from $15\times10^{-4}$ to $200\times10^{-4}$, more preferably in the range of from $70\times10^{-4}$ to $150\times10^{-4}$, and more preferably in the range of from $85\times10^{-4}$ to $100\times10^{-4}$.

When eicosapentaenoic acid and docosahexaenoic acid are contained as the (A) component in the emulsified liquid seasoning, the mass ratio of the total amount of (B) rosmarinic acid and (C) reduced glutathione blended in the emulsified liquid seasoning to the amount blended of (A2) α-linolenic acid derived from the fat or oil, in the emulsified liquid seasoning, $[\{(B)+(C)\}/(A2)]$, is preferably $3\times10^{-4}$ or more, more preferably $7\times10^{-4}$ or more, more preferably $15\times10^{-4}$ or more, and more preferably $30\times10^{-4}$ or more and preferably $300\times10^{-4}$ or less, more preferably $250\times10^{-4}$ or less, more preferably $100\times10^{-4}$ or less, more preferably $60\times10^{-4}$ or less, and more preferably $45\times10^{-4}$ or less from the same point of view as mentioned above.

Such a mass ratio, $[\{(B)+(C)\}/(A2)]$, is preferably in the range of from $3\times10^{-4}$ to $300\times10^{-4}$, more preferably in the range of from $7\times10^{-4}$ to $250\times10^{-4}$, more preferably in the range of from $15\times10^{-4}$ to $100\times10^{-4}$, more preferably in the range of from $30\times10^{-4}$ to $60\times10^{-4}$, and more preferably in the range of from $30\times10^{-4}$ to $45\times10^{-4}$.

When eicosapentaenoic acid and docosahexaenoic acid are not contained as the (A) component in the emulsified liquid seasoning of the present invention, the mass ratio of the total amount of (B) rosmarinic acid and (C) reduced glutathione blended in the emulsified liquid seasoning to the amount of blended (A) the ω3 fatty acids derived from the fat or oil, in the emulsified liquid seasoning, $[\{(B)+(C)\}/(A)]$, depends on the type of ω3 fatty acids to be used, and is preferably $1\times10^{-4}$ or more, more preferably $5\times10^{-4}$ or more, more preferably $7\times10^{-4}$ or more, and more preferably $9\times10^{-4}$ or more in view of the suppression in flavor deterioration with the storage and preferably $50\times10^{-4}$ or less, more preferably $35\times10^{-4}$ or less, more preferably $30\times10^{-4}$ or less, and more preferably $25\times10^{-4}$ or less in terms of a herb-like odor and a lasting feeling of aftertaste.

Such a mass ratio, $[\{(B)+(C)\}/(A)]$, is preferably in the range of from $1\times10^{-4}$ to $50\times10^{-4}$, more preferably in the range of from $5\times10^{-4}$ to $35\times10^{-4}$, more preferably in the range of from $7\times10^{-4}$ to $30\times10^{-4}$, and more preferably in the range of from $9\times10^{-4}$ to $25\times10^{-4}$.

When eicosapentaenoic acid and docosahexaenoic acid are not contained as the (A) component in the emulsified liquid seasoning of the present invention, the mass ratio of the total amount of (B) rosmarinic acid and (C) reduced glutathione blended in the emulsified liquid seasoning to the amount blended of (A2) α-linolenic acid derived from the fat or oil, in the emulsified liquid seasoning, $[\{(B)+(C)\}/(A2)]$, is preferably $1\times10^{-4}$ or more, more preferably $5\times10^{-4}$ or more, more preferably $7\times10^{-4}$ or more, and more preferably $9\times10^{-4}$ or more and preferably $50\times10^{-4}$ or less, more preferably $35\times10^{-4}$ or less, more preferably $30\times10^{-4}$ or less, and more preferably $25\times10^{-4}$ or less from the same point of view as mentioned above.

Such a mass ratio, $[\{(B)+(C)\}/(A2)]$, is preferably in the range of from $1\times10^{-4}$ to $50\times10^{-4}$, more preferably in the range of from $5\times10^{-4}$ to $35\times10^{-4}$, more preferably in the range of from $7\times10^{-4}$ to $30\times10^{-4}$, and more preferably in the range of from $9\times10^{-4}$ to $25\times10^{-4}$.

An emulsifier may be blended in the emulsified liquid seasoning of the present invention. Examples of the emulsifier include polyglycerin fatty acid esters, organic acid monoglycerides, sucrose fatty acid esters, and phospholipids. In view of the texture of the emulsified liquid seasoning, (D) a phospholipid is preferred.

Meanwhile, the amount of (D) the phospholipid blended in the emulsified liquid seasoning is 0.4% or less. When a large amount of (D) the phospholipid is blended in the emulsified liquid seasoning, it is difficult to maintain suitable viscosity in the use of the emulsified liquid seasoning, and deterioration is likely to proceed over time. When the blending proportion is 0.4% or less, suitable viscosity can be maintained, and the flavor deterioration of the emulsified liquid seasoning with the storage can be suppressed.

The amount of (D) the phospholipid blended in the emulsified liquid seasoning is preferably 0.4% or less and more preferably 0.3% or less in view of the suppression in flavor deterioration with the storage and preferably 0.001% or more, more preferably 0.005% or more, more preferably 0.01% or more, more preferably 0.02% or more, and more preferably 0.05% or more in view of viscosity suitable for use.

The amount of (D) the phospholipid blended in the emulsified liquid seasoning is from 0 to 0.4% and more preferably from 0.001 to 0.4%, more preferably from 0.005 to 0.4%, more preferably from 0.01 to 0.4%, more preferably from 0.02 to 0.3%, and more preferably from 0.05 to 0.3%.

The mass ratio between the oil phase and (D) the phospholipid, oil phase/phospholipid, in the emulsified liquid seasoning of the present invention is preferably 10 or more, more preferably 50 or more, more preferably 100 or more, and more preferably 250 or more in terms of emulsification stability. The mass ratio is preferably 6,000 or less, more preferably 3,000 or less, more preferably 1,000 or less, and more preferably 500 or less in terms of viscosity.

Such a mass ratio is preferably in the range of 10 to 6,000, more preferably in the range of 50 to 6,000, more preferably in the range of 100 to 6,000, more preferably in the range of 100 to 3,000, more preferably in the range of 100 to 1,000, more preferably in the range of 100 to 500, and more preferably in the range of 250 to 500.

(D) the phospholipid may be a natural product extracted from an animal or plant and refined, or a chemically synthesized product, or may be a product subjected to processing such as hydrogenation or hydroxylation treatment. As the natural product, lecithin which is an extracted and refined product from soybeans, egg yolk, or the like is preferred in terms of the easy availability of commercial products. Examples of the lecithin include soybean lecithin, egg yolk lecithin, soybean lecithin hydrogenated products, and egg yolk lecithin hydrogenated products.

Examples of the component of (D) the phospholipid include glycerophospholipids such as phosphatidylcholine, phosphatidic acid, phosphatidylserine, phosphatidylethanolamine, and phosphatidylinositol; and sphingophospholipids such as sphingomyelin and ceramide ciliatine.

The amount blended of an emulsifier other than the phospholipid is preferably 1.5% or less, more preferably 0.3% or less, and more preferably substantially 0% in the emulsified liquid seasoning in view of the texture of the emulsified liquid seasoning. Here, substantially 0% refers to a case where an emulsifier other than the phospholipid is irreversibly blended from another component used in the emulsified liquid seasoning.

(E) the average particle diameter of the emulsified liquid seasoning of the present invention is preferably 1 µm or more, more preferably 5 µm or more, and more preferably 10 µm or more in terms of viscosity suitable for use. (E) the average particle diameter of the emulsified liquid seasoning of the present invention is preferably 50 µm or less, more preferably 40 µm or less, more preferably 30 µm or less, and more preferably 20 µm or less in terms of emulsification stability.

(E) the average particle diameter of the emulsified liquid seasoning of the present invention is preferably from 1 to 50 µm, more preferably from 5 to 40 µm, more preferably from 10 to 30 µm, and more preferably from 10 to 20 µm.

Examples of the emulsified liquid seasoning of the present invention include semisolid dressings, emulsified liquid dressings, mayonnaise, and salad creamy dressings defined by the Japanese Agricultural Standards (JAS). Examples of the emulsified liquid seasoning of the present invention is not particularly limited thereto, and include those widely referred to as mayonnaise, mayonnaise-like foods, dressings, and dressing-like foods.

The blending ratio (mass ratio) between the oil phase and the aqueous phase in the emulsified liquid seasoning of the present invention is preferably oil phase/aqueous phase=10/90 to 80/20, more preferably from 20/80 to 80/20, more preferably from 20/80 to 70/30, and more preferably from 30/70 to 70/30.

The aqueous phase of the emulsified liquid seasoning of the present invention is not particularly limited, and may contain water; vinegars such as rice vinegar, sake lees vinegar, cider vinegar, grape vinegar, grain vinegar, and synthetic vinegar; salts such as common salt; seasonings such as sodium glutamate; saccharides such as sugar and starch syrup; taste materials such as sake and sweet sake; various vitamins; organic acids such as citric acid, and salts thereof; spices; squeezed juices of various vegetables or fruits such as lemon fruit juice; various vegetables; various fruits; polysaccharide thickeners such as xanthan gum, gellan gum, guar gum, tamarind gum, carrageenan, pectin, and tragacanth gum; starches such as potato starch, decomposition products thereof, and starches obtained by subjecting them to chemical modification treatment; dairy products such as milk; proteins such as soybean protein, milk protein, and wheat protein, or isolates and decomposition products of these proteins; various phosphates; and the like.

In the present invention, these may be appropriately blended depending on the viscosity and physical properties of the target composition, and the like. For example, the amount of a polysaccharide thickener, such as xanthan gum, blended in the emulsified liquid seasoning is preferably from 0 to 0.2% and more preferably from 0.02 to 0.08%.

The emulsified liquid seasoning of the present invention has a viscosity of preferably 3,500 mPa·s or less, more preferably from 800 to 3,500 mPa·s, more preferably from 900 to 3,000 mPa·s, more preferably from 1,000 to 2,000 mPa·s, and more preferably from 1,000 to 1,500 mPa·s at 20±2° C. in view of handling when the emulsified liquid seasoning is removed from a container, and melt in the mouth.

The pH (20° C.) of the emulsified liquid seasoning is preferably pH 5.5 or less in terms of storability and more preferably in the range of pH from 2.5 to 5.5, more preferably in the range of pH from 3 to 5, and more preferably in the range of pH 3.2 to 4.5. In order to decrease the pH within this range, acidulants such as vinegars, organic acids such as citric acid, malic acid, and gluconic acid, inorganic acids such as phosphoric acid, and lemon fruit juice can be used. The vinegars above mentioned are preferably used in terms of making storability better and in terms of maintaining the taste and flavor of the material immediately after emulsified liquid seasoning production.

The emulsified liquid seasoning of the present invention can be produced by blending (A) the ω3 fatty acids derived from the fat or oil, (B) rosmarinic acid, and (C) reduced glutathione, and (D) the phospholipid as needed. Preferably, it is preferred to use, as an oil phase, a fat or oil comprising ω3 fatty acids as a constituent fatty acid, mix the oil phase and an aqueous phase in which (B) rosmarinic acid and (C) reduced glutathione are blended, then conduct a preliminary emulsification of the mixture as needed, and homogenize the resulting mixture. When (D) the phospholipid is blended, it may be added to either the oil phase or the aqueous phase, and is preferably added to the aqueous phase.

Examples of the homogenizing machine include a high pressure homogenizer, an ultrasonic emulsifying machine, a colloid mill, AGI HOMO MIXER, and Milder.

The emulsified liquid seasoning thus produced is filled into a container, and can be used like usual dressings and the like as a packaged food. For example, it can be used for sauces such as tartar sauce, sandwiches, and salads, as well as cooking such as grilled dishes, stir-fried dishes, and dressed dishes.

Regarding the above-described embodiments, the present invention further discloses the following emulsified liquid seasoning or use.

<1> An emulsified liquid seasoning comprising the following components (A), (B), and (C) blended therein:
  (A) ω3 fatty acids derived from a fat or oil, in an amount of 3 to 20% by mass;
  (B) rosmarinic acid; and
  (C) reduced glutathione,
  wherein (D) a phospholipid is blended in an amount of 0.4% by mass or less in the emulsified liquid seasoning.

<2> The emulsified liquid seasoning according to <1>, wherein (A) the ω3 fatty acids derived from the fat or oil are preferably one or a combination of two or more selected from the group consisting of α-linolenic acid, eicosapentaenoic acid, and docosahexaenoic acid.

<3> The emulsified liquid seasoning according to <1> or <2>, wherein an amount blended of (A) the ω3 fatty acids derived from the fat or oil is preferably 4% by mass or more, more preferably 5% by mass or more, more preferably 7% by mass or more, and more preferably 10% by mass or more, and preferably 19% by mass or less, more preferably 18% by mass or less, more preferably 16% by mass or less, and more preferably 13% by mass or less, and preferably 4 to 19% by mass, more preferably 5 to 18% by mass, more preferably 7 to 16% by mass, and more preferably 10 to 13% by mass.

<4> The emulsified liquid seasoning according to any one of <1> to <3>, wherein a total amount blended of (A1) eicosapentaenoic acid and docosahexaenoic acid derived from a fat or oil is preferably 0.1% by mass or more, more preferably 0.5% by mass or more, more preferably 1% by mass or more, more preferably 2% by mass or more, and more preferably 3% by mass or more, and preferably 8% by mass or less, more preferably 7.5% by mass or less, more preferably 7% by mass or less, more preferably 6% by mass or less, and more preferably 5% by mass or less, and preferably from 0.1 to 8% by mass, more preferably from 0.5 to 7.5% by mass, more preferably from 1 to 7% by mass, more preferably from 2 to 6% by mass, and more preferably from 3 to 5% by mass.

<5> The emulsified liquid seasoning according to any one of <1> to <4>, wherein an amount blended of (A2) α-linolenic acid derived from a fat or oil is preferably 0.1% by mass or more, more preferably 0.5% by mass or more, more preferably 1% by mass or more, more preferably 3% by mass or more, and more preferably 7% by mass or more, and preferably 20% by mass or less, more preferably 19.5% by mass or less, more preferably 19% by mass or less, more preferably 17% by mass or less, and more preferably 13% by mass or less, and preferably from 0.1 to 20% by mass, more preferably from 0.5 to 19.5% by mass, more preferably from 1 to 19% by mass, more preferably from 3 to 17% by mass, and more preferably from 7 to 13% by mass.

<6> The emulsified liquid seasoning according to <1> or <2>, wherein, when the emulsified liquid seasoning contains (A1) eicosapentaenoic acid and docosahexaenoic acid derived from a fat or oil, an amount blended of (A) the ω3 fatty acids derived from the fat or oil, in the emulsified liquid seasoning, is preferably 10% by mass or less, more preferably 8% by mass or less, more preferably 6% by mass or less, more preferably 5% by mass or less, and more preferably 4% by mass or less and preferably from 3 to 16% by mass, more preferably from 3 to 10% by mass, more preferably from 3 to 8% by mass, more preferably from 3 to 6% by mass, more preferably from 3 to 5% by mass, and more preferably from 3 to 4% by mass.

<7> The emulsified liquid seasoning according to <1> or <2>, wherein, when the emulsified liquid seasoning does not contain (A1) eicosapentaenoic acid and docosahexaenoic acid derived from a fat or oil, an amount blended of (A) the ω3 fatty acids derived from the fat or oil, in the emulsified liquid seasoning, is preferably 11% by mass or less and more preferably 10% by mass or less and preferably from 3 to 18% by mass, more preferably from 3 to 13% by mass, more preferably from 3 to 11% by mass, more preferably from 4 to 11% by mass, and more preferably from 4 to 10% by mass.

<8> The emulsified liquid seasoning according to any one of <1> to <3> and <6>, wherein, when the emulsified liquid seasoning contains (A1) eicosapentaenoic acid and docosahexaenoic acid derived from the fat or oil, and (A2) α-linolenic acid derived from a fat or oil, a total amount blended of (A1) eicosapentaenoic acid and docosahexaenoic acid derived from the fat or oil, in the emulsified liquid seasoning is preferably 0.1% by mass or more, more preferably 0.5% by mass or more, more preferably 1% by mass or more, more preferably 2% by mass or more, and more preferably 3% by mass or more, and preferably 8% by mass or less, more preferably 7.5% by mass or less, more preferably 7% by mass or less, more preferably 6% by mass or less, more preferably 5% by mass or less, more preferably 4% by mass or less, more preferably 3% by mass or less, more preferably 2% by mass or less, and more preferably 1.5% by mass or less, and preferably from 0.1 to 8% by mass, more preferably from 0.5 to 7.5% by mass, more preferably from 0.5 to 7% by mass, more preferably from 0.5 to 6% by mass, more preferably from 0.5 to 5% by mass, more preferably from 0.5 to 4% by mass, more preferably from 0.5 to 3% by mass, more preferably from 0.5 to 2% by mass, and more preferably from 0.5 to 1.5% by mass.

<9> The emulsified liquid seasoning according to any one of <1> to <3>, <6>, and <8>, wherein, when the emulsified liquid seasoning contains (A1) eicosapentaenoic acid and docosahexaenoic acid derived from the fat or oil, and (A2) α-linolenic acid derived from the fat or oil, an amount blended of (A2) α-linolenic acid derived from the fat or oil, in the emulsified liquid seasoning, is preferably 0.1% by mass or more, more preferably 0.5% by mass or more, more preferably 1% by mass or more, and more preferably 2% by mass or more, and preferably 8% by mass or less, more preferably 6% by mass or less, and more preferably 4% by mass or less, and preferably from 0.1 to 8% by mass, more preferably from 0.5 to 6% by mass, more preferably from 1 to 4% by mass, and more preferably from 2 to 4% by mass.

<10> The emulsified liquid seasoning according to any one of <1> to <3> and <7>, wherein, when the emulsified liquid seasoning does not contain (A1) eicosapentaenoic acid and docosahexaenoic acid derived from the fat or oil, an amount blended of (A2) α-linolenic acid derived from a fat or oil, in the emulsified liquid seasoning is preferably 0.1% by mass or more, more preferably 0.5% by mass or more, more preferably 1% by mass or more, more preferably 3% by mass or more, and more preferably 7% by mass or more, and preferably 20% by mass or less, more preferably 19.5% by mass or less, more preferably 19% by mass or less, more preferably 17% by mass or less, more preferably 13% by mass or less, and more preferably 11% by mass or less, and preferably from 0.1 to 20% by mass, more preferably from 0.5 to 19.5% by mass, more preferably from 1 to 19% by mass, more preferably from 3 to 17% by mass, more preferably from 3 to 13% by mass, and more preferably from 3 to 11% by mass.

<11> The emulsified liquid seasoning according to any one of <1> to <10>, wherein an amount of the fat or oil blended is preferably 10% by mass or more, more preferably 20% by mass or more, and more preferably 25% by mass or more, and preferably 60% by mass or less, more preferably 50% by mass or less, and more preferably 40% by mass or less, and preferably from 10 to 60% by mass, more preferably from 20 to 50% by mass, and more preferably from 25 to 40% by mass.

<12> The emulsified liquid seasoning according to any one of <1> to <11>, wherein preferably 60% by mass or more, more preferably 70% by mass or more, more preferably 75% by mass or more, and more preferably 80% by mass or more of fatty acids constituting the fat or oil are unsaturated fatty acids, and preferably 100% by mass or less, more preferably 99% by mass or less, and more preferably 98% by mass or less of the fatty acids constituting the fat or oil are unsaturated fatty acids, and preferably from 60 to 100% by mass, more preferably from 70 to 100% by mass, more preferably from 75 to 99% by mass, and more preferably from 80 to 98% by mass of the fatty acids constituting the fat or oil are unsaturated fatty acids.

<13> The emulsified liquid seasoning according to any one of <1> to <12>, wherein a content of saturated fatty acids in the fatty acids constituting the fat or oil is preferably 40% by mass or less, more preferably 30% by mass or less, more preferably 25% by mass or less, and more preferably 20% by mass or less and preferably 0.5% by mass or more.

<14> The emulsified liquid seasoning according to any one of <1> to <13>, wherein a content of triacylglycerol in the fat or oil is preferably from 78 to 100% by mass, more preferably from 88 to 100% by mass, more preferably from 90 to 99.5% by mass, and more preferably from 92 to 99% by mass.

<15> The emulsified liquid seasoning according to any one of <1> to <14>, wherein the fat or oil is preferably one or more selected from the group consisting of vegetable oils such as soybean oil, rapeseed oil, safflower oil, corn oil, sunflower oil, cottonseed oil, olive oil, sesame oil, peanut oil, adlay oil, wheat germ oil, perilla oil, and linseed (flaxseed) oil, algae oil, and fish oil and more preferably a mixed oil of one or more selected from the group consisting of linseed (flaxseed) oil, perilla oil, algae oil, and fish oil and one or more selected from the group consisting of soybean oil, rapeseed oil, safflower oil, corn oil, sunflower oil, cottonseed oil, olive oil, and sesame oil.

<16> The emulsified liquid seasoning according to any one of <1> to <15>, wherein an amount of (B) rosmarinic acid blended is preferably 1 ppm (parts per million by mass) or more, more preferably 10 ppm or more, more preferably 50 ppm or more, and more preferably 100 ppm or more, and preferably 400 ppm or less, more preferably 390 ppm or less, more preferably 350 ppm or less, more preferably 300 ppm or less, and more preferably 250 ppm or less, and preferably from 1 to 400 ppm, more preferably from 10 to 390 ppm, more preferably from 50 to 350 ppm, more preferably from 100 to 300 ppm, and more preferably from 100 to 250 ppm.

<17> The emulsified liquid seasoning according to any one of <1> to <6>, <8>, <9>, and <11> to <15>, wherein when the emulsified liquid seasoning contains eicosapentaenoic acid and docosahexaenoic acid as the (A) component, an amount of (B) rosmarinic acid blended is preferably 1 ppm (parts per million by mass) or more, more preferably 10 ppm or more, more preferably 50 ppm or more, and more preferably 100 ppm or more, and preferably 400 ppm or less, more preferably 390 ppm or less, more preferably 350 ppm or less, more preferably 300 ppm or less, more preferably 250 ppm or less, more preferably 200 ppm or less, and more preferably 150 ppm or less, and preferably from 1 to 400 ppm, more preferably from 10 to 390 ppm, more preferably from 50 to 350 ppm, more preferably from 50 to 250 ppm, more preferably from 50 to 200 ppm, more preferably from 50 to 150 ppm, and more preferably from 100 to 150 ppm.

<18> The emulsified liquid seasoning according to any one of <1> to <3>, <7>, and <10> to <15>, wherein when the emulsified liquid seasoning does not contain eicosapentaenoic acid and docosahexaenoic acid as the (A) component, an amount of (B) rosmarinic acid blended is preferably 1 ppm (parts per million by mass) or more, more preferably 10 ppm or more, more preferably 50 ppm or more, and more preferably 100 ppm or more, and preferably 400 ppm or less, more preferably 300 ppm or less, more preferably 200 ppm or less, and more preferably 150 ppm or less, and preferably from 1 to 400 ppm, more preferably from 10 to 300 ppm, more preferably from 50 to 200 ppm, and more preferably from 100 to 150 ppm.

<19> The emulsified liquid seasoning according to any one of <1> to <18>, by further comprising carnosic acid, carnosol, or a combination thereof.

<20> The emulsified liquid seasoning according to <19>, wherein an amount of carnosic acid, carnosol, or the combination thereof blended is preferably from 0.1 to 40 ppm and more preferably from 10 to 30 ppm.

<21> The emulsified liquid seasoning according to any one of <1> to <20>, wherein an amount of (C) reduced glutathione blended is preferably 0.1 ppm (parts per million by mass) or more, more preferably 0.5 ppm or more, more preferably 1 ppm or more, more preferably 3 ppm or more, and more preferably 5 ppm or more, and preferably 30 ppm or less, more preferably 20 ppm or less, more preferably 18 ppm or less, more preferably 15 ppm or less, and more preferably 12 ppm or less, and preferably from 0.1 to 30 ppm, more preferably from 0.5 to 20 ppm, more preferably from 1 to 18 ppm, more preferably from 3 to 15 ppm, and more preferably from 5 to 12 ppm.

<22> The emulsified liquid seasoning according to any one of <1> to <6>, <8>, <9>, <11> to <15>, <17>, and <19> to <21>, wherein when the emulsified liquid seasoning contains eicosapentaenoic acid and docosahexaenoic acid as the (A) component, a mass ratio of a total amount blended of (B) rosmarinic acid and (C) reduced glutathione in the emulsified liquid seasoning to the amount blended of (A) the ω3 fatty acids derived from the fat or oil, in the emulsified liquid seasoning, $[\{(B)+(C)\}/(A)]$, is preferably $1\times10^{-4}$ or more, more preferably $5\times10^{-4}$ or more, more preferably $15\times10^{-4}$ or more, and more preferably $25\times10^{-4}$ or more, and preferably $100\times10^{-4}$ or less, more preferably $70\times10^{-4}$ or less, more preferably $50\times10^{-4}$ or less, and more preferably $35\times10^{-4}$ or less, and preferably in a range of from $1\times10^{-4}$ to $100\times10^{-4}$, more preferably in a range of from $5\times10^{-4}$ to $70\times10^{-4}$, more preferably in a range of from $15\times10^{-4}$ to $50\times10^{-4}$, and more preferably in a range of from $25\times10^{-4}$ to $35\times10^{-4}$.

<23> The emulsified liquid seasoning according to any one of <1> to <6>, <8>, <9>, <11> to <15>, <17>, and <19> to <22>, wherein a mass ratio of the total amount blended of (B) rosmarinic acid and (C) reduced glutathione in the emulsified liquid seasoning to the total amount blended of (A1) eicosapentaenoic acid and docosahexaenoic acid derived from the fat or oil, in the emulsified liquid seasoning, $[\{(B)+(C)\}/(A1)]$, is preferably $5\times10^{-4}$ or more, more preferably $15\times10^{-4}$ or more, more preferably $70\times10^{-4}$ or more, and more preferably $85\times10^{-4}$ or more, and preferably $300\times10^{-4}$ or less, more preferably $200\times10^{-4}$ or less, more preferably $150\times10^{-4}$ or less, and more preferably $100\times10^{-4}$ or less, and preferably in a range of from $5\times10^{-4}$ to $300\times10^{-4}$, more preferably in a range of from $15\times10^{-4}$ to $200\times10^{-4}$, more preferably in a range of from $70\times10^{-4}$ to $150\times10^{-4}$, and more preferably in a range of from $85\times10^{-4}$ to $100\times10^{-4}$.

<24> The emulsified liquid seasoning according to any one of <1> to <6>, <8>, <9>, <11> to <15>, <17>, and <19> to <23>, wherein when the emulsified liquid seasoning contains eicosapentaenoic acid and docosahexaenoic acid as the (A) component, a mass ratio of the total amount blended of (B) rosmarinic acid and (C) reduced glutathione in the emulsified liquid seasoning to the amount blended of (A2) α-linolenic acid derived from the fat or oil, in the emulsified liquid seasoning, $[\{(B)+(C)\}/(A2)]$, is preferably $3\times10^{-4}$ or more, more preferably $7\times10^{-4}$ or more, more preferably $15\times10^{-4}$ or more, and more preferably $30\times10^{-4}$ or more, and preferably $300\times10^{-4}$ or less, more preferably $250\times10^{-4}$ or less, more preferably $100\times10^{-4}$ or less, more preferably $60\times10^{-4}$ or less, and more preferably $45\times10^{-4}$ or less, and preferably in a range of from $3\times10^{-4}$ to $300\times10^{-4}$, more preferably in a range of from $7\times10^{-4}$ to $250\times10^{-4}$, more preferably in a range of from $15\times10^{-4}$ to $100\times10^{-4}$, more preferably in a range of from $30\times10^{-4}$ to $60\times10^{-4}$, and more preferably in a range of from $30\times10^{-4}$ to $45\times10^{-4}$.

<25> The emulsified liquid seasoning according to any one of <1> to <3>, <7>, <10> to <15>, and <18> to <21>, wherein when the emulsified liquid seasoning does not contain eicosapentaenoic acid and docosahexaenoic acid as the (A) component, a mass ratio of the total amount blended of (B) rosmarinic acid and (C) reduced glutathione in the emulsified liquid seasoning to the amount blended of (A) the ω3 fatty acids derived from the fat or oil, in the emulsified liquid seasoning, $[\{(B)+(C)\}/(A)]$, is preferably $0.1\times10^{-4}$ or more, more preferably $0.3\times10^{-4}$ or more, more preferably $0.5\times10^{-4}$ or more, more preferably $0.7\times10^{-4}$ or more, more preferably $1\times10^{-4}$ or more, more preferably $5\times10^{-4}$ or more, more preferably $7\times10^{-4}$ or more, and more preferably $9\times10^{-4}$ or more, and preferably $50\times10^{-4}$ or less, more preferably $35\times10^{-4}$ or less, more preferably $30\times10^{-4}$ or less, and more preferably $25\times10^{-4}$ or less, and preferably in a range of from $1\times10^{-4}$ to $50\times10^{-4}$, more preferably in a range of from $5\times10^{-4}$ to $35\times10^{-4}$, more preferably in a range of from $7\times10^{-4}$ to $30\times10^{-4}$, and more preferably in a range of from $9\times10^{-4}$ to $25\times10^{-4}$.

<26> The emulsified liquid seasoning according to any one of <1> to <3>, <7>, <10> to <15>, <18> to <21>, and <25>, wherein when the emulsified liquid seasoning does not contain eicosapentaenoic acid and docosahexaenoic acid as the (A) component, a mass ratio of the total amount blended of (B) rosmarinic acid and (C) reduced glutathione in the emulsified liquid seasoning to the amount blended of (A2) α-linolenic acid derived from the fat or oil, in the emulsified liquid seasoning, $[\{(B)+(C)\}/(A2)]$, is preferably $0.1\times10^{-4}$ or more, more preferably $0.3\times10^{-4}$ or more, more preferably $0.5\times10^{-4}$ or more, more preferably $0.7\times10^{-4}$ or more, more preferably $1\times10^{-4}$ or more, more preferably $5\times10^{-4}$ or more, more preferably $7\times10^{-4}$ or more, and more preferably $9\times10^{-4}$ or more, and preferably $50\times10^{-4}$ or less, more preferably $35\times10^{-4}$ or less, more preferably $30\times10^{-4}$ or less, and more preferably $25\times10^{-4}$ or less, and preferably in a range of from $1\times10^{-4}$ to $50\times10^{-4}$, more preferably in a range of from $5\times10^{-4}$ to $35\times10^{-4}$, more preferably in a range of from $7\times10^{-4}$ to $30\times10^{-4}$, and more preferably in a range of from $9\times10^{-4}$ to $25\times10^{-4}$.

<27> The emulsified liquid seasoning according to any one of <1> to <26>, obtained by further blending an emulsifier.

<28> The emulsified liquid seasoning according to <27>, wherein the emulsifier is preferably one or more selected from the group consisting of a polyglycerin fatty acid ester, an organic acid monoglyceride, and a sucrose fatty acid ester.

<29> The emulsified liquid seasoning according to any one of <1> to <28>, wherein the amount of (D) the phospholipid blended is preferably 0.3% by mass or less, and preferably 0.001% by mass or more, more preferably 0.005% by mass or more, more preferably 0.01% by mass or more, more preferably 0.02% by mass or more, and more preferably 0.05% by mass or more, and preferably from 0 to 0.4% by mass, more preferably from 0.001 to 0.4% by mass, more preferably from 0.005 to 0.4% by mass, more preferably from 0.01 to 0.4% by mass, more preferably from 0.02 to 0.3% by mass, and more preferably from 0.05 to 0.3% by mass.

<30> The emulsified liquid seasoning according to any one of <1> to <29>, wherein a mass ratio between an oil phase and (D) the phospholipid, oil phase/phospholipid, in the emulsified liquid seasoning is preferably 10 or more, more preferably 50 or more, more preferably 100 or more, and more preferably 250 or more, and preferably 6,000 or less, more preferably 3,000 or less, more preferably 1,000 or less, and more preferably 500 or less, and preferably in a range of from 10 to 6,000, more preferably in a range of from 50 to 6,000, more preferably in a range of from 100 to 6,000, more preferably in a range of from 100 to 3,000, more preferably in a range of from 100 to 1,000, more preferably in a range of from 100 to 500, and more preferably in a range of from 250 to 500.

<31> The emulsified liquid seasoning according to any one of <1> to <30>, wherein an amount blended of the emulsifier other than the phospholipid is preferably 1.5% by mass or less, more preferably 0.3% by mass or less, and more preferably substantially 0% by mass.

<32> The emulsified liquid seasoning according to any one of <1> to <31>, wherein (E) the average particle diameter of the emulsified liquid seasoning is preferably 1 μm or more, more preferably 5 μm or more, and more preferably 10 μm or more, and preferably 50 μm or less, more preferably 40 μm or less, more preferably 30 μm or less, and more preferably 20 μm or less, and preferably from 1 to 50 μm, more preferably from 5 to 40 μm, more preferably from 10 to 30 μm, and more preferably from 10 to 20 μm.

<33> The emulsified liquid seasoning according to any one of <1> to <32>, wherein a blending ratio (mass ratio) between the oil phase and an aqueous phase in the emulsified liquid seasoning is preferably oil phase/aqueous phase=10/90 to 80/20, more preferably oil phase/aqueous phase=20/80 to 80/20, more preferably oil phase/aqueous phase=20/80 to 70/30, and more preferably oil phase/aqueous phase=30/70 to 70/30.

<34> The emulsified liquid seasoning according to any one of <1> to <33>, wherein an amount of a polysaccharide thickener blended in the emulsified liquid seasoning is preferably from 0 to 0.2% by mass and more preferably from 0.02 to 0.08% by mass.

<35> The emulsified liquid seasoning according to any one of <1> to <34>, having a viscosity of preferably 3,500 mPa·s or less, more preferably from 800 to 3,500 mPa·s, more preferably from 900 to 3,000 mPa·s, more preferably from 1,000 to 2,000 mPa·s, and more preferably 1,000 to 1,500 mPa·s at 20±2° C.

<36> A method for producing an emulsified liquid seasoning, comprising a step of blending (A) ω3 fatty acids derived from a fat or oil, (B) rosmarinic acid, and (C) reduced glutathione, and (D) phospholipid as needed, wherein an amount of the component (A) blended is 3 to 20% by mass based on a total mass of all raw materials blended, and an amount of the component (D) blended is 0.4% by mass or less based on the total mass of all the raw materials blended.

EXAMPLES

Analysis Methods (1) Glyceride Composition of Oil or Fat

About 10 mg of a fat or oil sample and 0.5 mL of a trimethylsilylating agent ("silylating agent TH", manufactured by KANTO CHEMICAL CO., INC.) were put in a sample glass bottle, hermetically sealed, and heated at 70° C. for 15 minutes. 1.0 mL of water and 1.5 mL of hexane were added thereto, and the mixture was shaken. After allowing to stand, the upper layer was subjected to gas chromatography (GLC) and analyzed.

GLC Analysis Conditions

Conditions

Apparatus: Agilent 6890 Series (manufactured by Agilent Technologies)
Integrator: ChemStation B 02.01 SR2 (manufactured by Agilent Technologies)
Column: DB-1 ht (manufactured by Agilent J & W)
Carrier gas: 1.0 mL He/min
Injector: Split (1:50), T=320° C.
Detector: FID, T=350° C.
Oven temperature: the temperature was increased from 80° C. to 340° C. at 10° C./min and maintained for 15 minutes (2) Constituent Fatty Acid Composition of Oil or Fat A fatty acid methyl ester was prepared in accordance with "Preparation of Methyl Ester of Fatty Acids (2.4.1.-1996)" in "the JOCS Standard Methods for the Analysis of Fats, Oils and Related Materials" edited by the Japan Oil Chemists' Society, and the obtained fat or oil sample was measured by American Oil Chemists. Society Official Method Ce 1f-96 (GLC method).

GLC Analysis Conditions

Column: CP-SIL88 100 m×0.25 mm×0.2 μm (VARIAN)
Carrier gas: 1.0 mL He/min
Injector: Split (1:200), T=250° C.
Detector: FID, T=250° C.
Oven temperature: the temperature was maintained at 174° C. for 50 minutes, then increased to 220° C. at 5° C./min, and maintained for 25 minutes (3) Rosmarinic Acid Rosmarinic acid was measured by high performance liquid chromatography (HPLC).

HPLC Analysis Conditions

Apparatus: Agilent 1100 Series (manufactured by Agilent Technologies)
Column: ZORBAX Eclipse XDB-C18 4.6×150 mm, 5 μm (manufactured by Agilent Technologies)
Mobile phase solvents: deionized water:acetonitrile:methanol:acetic acid=840:150:111:8.5
Flow rate: 1.0 mL/min
Detection wavelength: 340 nm (4) Carnosic Acid and Carnosol Carnosic acid and carnosol were measured by high performance liquid chromatography (HPLC).

HPLC Analysis Conditions

Apparatus: Agilent 1100 Series (manufactured by Agilent Technologies)
Column: Inertsil ODS-P 4.6×150 mm, 5 μm (manufactured by GL Sciences Inc.)
Mobile phase solvents: phosphoric acid aqueous solution: acetonitrile=80:20 (0 to 40 min), acetonitrile (from 40 min)
Flow rate: 1.0 mL/min
Detection wavelength: 284 nm (5) Reduced Glutathione Reduced glutathione was measured by high performance liquid chromatography (HPLC).

HPLC Analysis Conditions

Apparatus: LC-20AD, SPD-20AV (SHIMADZU CORPORATION)
Column: Develosil ODS-5 (Nomura Chemical Co., Ltd.)
Mobile phase solvents: (A) 0.025 mol/L ammonium formate (pH 4.0), (B) methanol ((A):(B)=9:1 (v/v))
Flow rate of mobile phase solvents: 0.7 mL/min
Detection wavelength: 280 nm (6) Phospholipid A phospholipid was measured by a colorimetric method (as stearo-oleo-lecithin). For the procedure, a sample comprising a phospholipid was subjected to solvent extraction (chloroform:methanol=2:1) followed by dry aching (550° C.). Then, a molybdenum blue color reagent and an ascorbic acid solution were added thereto, and the absorbance of the resultant was measured (710 nm) to obtain the amount of phosphorus.
The phospholipid was calculated from the amount of phosphorus obtained. The conversion coefficient was 25.4.

Raw Materials

Rapeseed oil: Nisshin rapeseed salad oil S (manufactured by The Nisshin Oillio Group, Ltd.), ALA content 9.1% by mass
Fish oil: refined fish oil DHA-27 (manufactured by Nippon Suisan Kaisha, Ltd.), ALA content 1.5% by mass, total content of DHA and EPA 36.9% by mass
Linseed oil: linseed oil (manufactured by Summit Oil Mill Co., Ltd.), ALA content 57.5% by mass
Rosmarinic acid-containing preparation: RM-21A base (manufactured by Mitsubishi-Kagaku Foods Corporation), rosmarinic acid content 10% by mass,
Carnosic acid- and carnosol-containing preparation: StabilEnhance OSR D4 (manufactured by NATUREX)
Reduced glutathione (GSH)-containing yeast: Engevita GSH (manufactured by Lallemand Inc.), reduced glutathione (GSH) content 1.0% by mass Examples 1 to 18 and Comparative Examples 1 to 4

Preparation of Emulsified Liquid Dressing

The raw materials of an aqueous phase other than egg yolk were blended in amounts shown in Table 1, and these raw materials were stirred and mixed for dissolution to prepare the aqueous phase. Meanwhile, the raw materials of an oil phase were blended in amounts shown in Table 1, and stirred and mixed. Next, the aqueous phase was heated from room temperature, and after reaching 80° C., the aqueous phase was maintained for 4 minutes for heat treatment (sterilization treatment) and then cooled to room temperature. Then, while the aqueous phase was stirred, egg yolk was added thereto and the oil phase was further blended therewith over 1 minute with stirring, and the mixture was homogenized to prepare an emulsified liquid seasoning having a pH of 3.85. The prepared emulsified liquid seasoning was filled into a PET bottle with a lid.

Sensory Evaluation

A sample was stored in a dark place at 40° C. for 40 days, and then the temperature was controlled to 10° C. 7 g of the sample sufficiently shaken and mixed was added to 20 g of lettuce and eaten in the form of a cooked product. The fishy odor and herbal odor and lasting feeling of aftertaste of the cooked product were evaluated by a panel of five experts in accordance with the criteria shown below. For the "fishy odor", "herbal odor", and "lasting feeling of aftertaste", the case where the odor or the feeling was not felt was defined as 0 points. For the "fishy odor", the sensory evaluation of Comparative Example 1 was defined as 8 points (very much felt). For the "herbal odor", the evaluation of Comparative Example 2 was defined as 8 points (very much felt). For the "lasting feeling of aftertaste", the evaluation of Comparative Example 3 was defined as 8 points (very much felt). For all the Examples and the Comparative Examples described in Table 1, the score was determined by the discussion.

0: not felt
1: faintly felt
2: slightly felt
3: felt a little
4: somewhat felt
5: felt
6: considerably felt
7: much felt
8: very much felt Measurement of Viscosity For a temperature of sample, it was controlled to 20±2° C. in a booth under a 20° C. atmosphere, and then the sample was measured under the conditions of 20 r/min, rotor No. 3, and 30 seconds using a BH viscometer (TVB10 viscometer (TOKI SANGYO CO., LTD.).

Measurement of Average Particle Diameter

Each emulsified composition obtained in each Example and Comparative Example was diluted and dispersed in a 0.5% SDS (sodium dodecyl sulfate) aqueous solution. The resulting dispersion was used as a sample. The average particle diameter (median diameter (volume-based, refractive index 1.60-0.10 i)) was measured using a laser diffraction particle size analyzer (trade name: SALD-2100, manufactured by SHIMADZU CORPORATION).

The results are shown in Table 1.

TABLE 1

|  | (% by mass) | Example 1 | Example 2 | Example 3 | Example 4 | Example 5 | Example 6 | Example 7 | Example 8 | Example 9 |
|---|---|---|---|---|---|---|---|---|---|---|
| Aqueous phase | Sugar | 13 | 13 | 13 | 13 | 13 | 13 | 13 | 13 | 13 |
|  | Soy sauce | 22 | 22 | 22 | 22 | 22 | 22 | 22 | 22 | 22 |
|  | Xanthan gum | 0.06 | 0.06 | 0.06 | 0.06 | 0.06 | 0.06 | 0.06 | 0.06 | 0.06 |
|  | Sodium glutamate | 0.1 | 0.1 | 0.1 | 0.1 | 0.1 | 0.1 | 0.1 | 0.1 | 0.1 |
|  | Gluconic acid | 0.8 | 0.8 | 0.8 | 0.8 | 0.8 | 0.8 | 0.8 | 0.8 | 0.8 |
|  | Sesame | 8.5 | 8.5 | 8.5 | 8.5 | 8.5 | 8.5 | 8.5 | 8.5 | 8.5 |
|  | Shiitake mushroom extract | 0.3 | 0.3 | 0.3 | 0.3 | 0.3 | 0.3 | 0.3 | 0.3 | 0.3 |
|  | Brewed vinegar (acidity 15%) | 3.5 | 3.5 | 3.5 | 3.5 | 3.5 | 3.5 | 3.5 | 3.5 | 3.5 |
|  | Egg yolk (10% salted) | 1.5 | 1.5 | 1.5 | 1.5 | 1.5 | 1.5 | 1.5 | 1.5 | 1.5 |
|  | Water | Balance | Balance | Balance | Balance | Balance | Balance | Balance | Balance | Balance |
|  | Rosmarinic acid-containing preparation | 0.01 | 0.01 | 0.01 | 0.1 | 0.1 | 0.1 | 0.2 | 0.2 | 0.2 |
|  | GSH-containing yeast | 0.008 | 0.1 | 0.2 | 0.008 | 0.1 | 0.2 | 0.008 | 0.1 | 0.2 |
| Oil phase | Rapeseed oil | 27 | 27 | 27 | 27 | 27 | 27 | 27 | 27 | 27 |
|  | Fish oil | 3 | 3 | 3 | 3 | 3 | 3 | 3 | 3 | 3 |
|  | Carnosic acid- and carnosol-containing preparation | — | — | — | — | — | — | — | — | — |
|  | Total | 100.0 | 100.0 | 100.0 | 100.0 | 100.0 | 100.0 | 100.0 | 100.0 | 100.0 |
|  | (A1) DHA + EPA (% by mass) | 1.1 | 1.1 | 1.1 | 1.1 | 1.1 | 1.1 | 1.1 | 1.1 | 1.1 |
|  | (A2) α-linolenic acid (% by mass) | 2.5 | 2.5 | 2.5 | 2.5 | 2.5 | 2.5 | 2.5 | 2.5 | 2.5 |
|  | (B) rosmarinic acid (ppm) | 10 | 10 | 10 | 100 | 100 | 100 | 200 | 200 | 200 |
|  | (C) reduced glutathione (ppm) | 0.8 | 10 | 20 | 0.8 | 10 | 20 | 0.8 | 10 | 20 |
|  | (D) phospholipid (% by mass) | 0.106 | 0.106 | 0.106 | 0.106 | 0.106 | 0.106 | 0.106 | 0.106 | 0.106 |
|  | Carnosic acid and carnosol (ppm) | 0 | 0 | 0 | 0 | 0 | 0 | 0 | 0 | 0 |
|  | {(B) + (C)}/(A)(×10$^{-4}$) | 3.0 | 5.5 | 8.3 | 27.9 | 30.5 | 33.3 | 55.6 | 58.2 | 61.0 |
|  | {(B) + (C)}/(A1)(×10$^{-4}$) | 9.8 | 18.1 | 27.1 | 91.1 | 99.4 | 108.4 | 181.4 | 189.7 | 198.7 |
|  | {(B) + (C)}/(A2)(×10$^{-4}$) | 4.3 | 8.0 | 12.0 | 40.3 | 44.0 | 48.0 | 80.3 | 83.9 | 87.9 |
| Evaluation items | Fishy odor | 3 | 2 | 2 | 0 | 0 | 0 | 0 | 0 | 0 |
|  | Herbal odor | 0 | 0 | 0 | 1 | 1 | 1 | 2 | 2 | 2 |
|  | Lasting feeling of aftertaste | 0 | 1 | 2 | 0 | 1 | 2 | 0 | 1 | 2 |
|  | Viscosity (mPa · s) | 1183 | 1130 | 1169 | 1189 | 1102 | 1102 | 1101 | 1140 | 1135 |
|  | Average particle diameter (μm) | 16.8 | 17.4 | 16.9 | 16.5 | 17.0 | 17.1 | 17.3 | 16.5 | 17.3 |

|  | (% by mass) | Example 10 | Example 11 | Example 12 | Example 13 | Example 14 | Example 15 | Example 16 | Example 17 | Example 18 |
|---|---|---|---|---|---|---|---|---|---|---|
| Aqueous phase | Sugar | 13 | 13 | 13 | 13 | 13 | 13 | 13 | 13 | 13 |
|  | Soy sauce | 22 | 22 | 22 | 22 | 22 | 22 | 22 | 22 | 22 |
|  | Xanthan gum | 0.06 | 0.06 | 0.06 | 0.06 | 0.06 | 0.06 | 0.06 | 0.06 | 0.06 |
|  | Sodium glutamate | 0.1 | 0.1 | 0.1 | 0.1 | 0.1 | 0.1 | 0.1 | 0.1 | 0.1 |
|  | Gluconic acid | 0.8 | 0.8 | 0.8 | 0.8 | 0.8 | 0.8 | 0.8 | 0.8 | 0.8 |
|  | Sesame | 8.5 | 8.5 | 8.5 | 8.5 | 8.5 | 8.5 | 8.5 | 8.5 | 8.5 |
|  | Shiitake mushroom extract | 0.3 | 0.3 | 0.3 | 0.3 | 0.3 | 0.3 | 0.3 | 0.3 | 0.3 |
|  | Brewed vinegar (acidity 15%) | 3.5 | 3.5 | 3.5 | 3.5 | 3.5 | 3.5 | 3.5 | 3.5 | 3.5 |
|  | Egg yolk (10% salted) | 1.5 | 1.5 | 1.5 | 0.1 | 0.3 | 3 | 5 | 1.5 | 1.5 |
|  | Water | Balance | Balance | Balance | Balance | Balance | Balance | Balance | Balance | Balance |
|  | Rosmarinic acid-containing preparation | 0.1 | 0.1 | 0.3 | 0.005 | 0.005 | 0.005 | 0.005 | 0.3 | 0.3 |
|  | GSH-containing yeast | 0.1 | 0.1 | 0.2 | 0.1 | 0.1 | 0.1 | 0.1 | 0.2 | 0.2 |
| Oil phase | Rapeseed oil | 24 | 21 | 12 | 27 | 27 | 27 | 27 | 12 | 12 |
|  | Fish oil | 6 | 9 | 18 | 3 | 3 | 3 | 3 | 18 | 18 |
|  | Carnosic acid- and carnosol-containing preparation | — | — | — | — | — | — | — | 0.001 | 0.05 |
|  | Total | 100.0 | 100.0 | 100.0 | 100.0 | 100.0 | 100.0 | 100.0 | 100.0 | 100.0 |
|  | (A1) DHA + EPA (% by mass) | 2.2 | 3.3 | 6.6 | 1.1 | 1.1 | 1.1 | 1.1 | 6.6 | 6.6 |
|  | (A2) α-linolenic acid (% by mass) | 2.3 | 2 | 1.4 | 2.5 | 2.5 | 2.5 | 2.5 | 1.4 | 1.4 |
|  | (B) rosmarinic acid (ppm) | 100 | 100 | 300 | 5 | 5 | 5 | 5 | 300 | 300 |
|  | (C) reduced glutathione (ppm) | 10 | 10 | 20 | 10 | 10 | 10 | 10 | 20 | 20 |
|  | (D) phospholipid (% by mass) | 0.106 | 0.106 | 0.106 | 0.007 | 0.021 | 0.212 | 0.354 | 0.106 | 0.106 |
|  | Carnosic acid and carnosol (ppm) | 0 | 0 | 0 | 0 | 0 | 0 | 0 | 0.5 | 24.3 |
|  | {(B) + (C)}/(A)(×10$^{-4}$) | 24.5 | 20.5 | 40.0 | 4.2 | 4.2 | 4.2 | 4.2 | 40.0 | 40.0 |
|  | {(B) + (C)}/(A1)(×10$^{-4}$) | 49.7 | 33.1 | 48.2 | 13.6 | 13.6 | 13.6 | 13.6 | 48.2 | 48.2 |
|  | {(B) + (C)}/(A2)(×10$^{-4}$) | 48.4 | 53.8 | 234.9 | 6.0 | 6.0 | 6.0 | 6.0 | 234.9 | 234.9 |
| Evaluation items | Fishy odor | 2 | 3 | 3 | 4 | 4 | 4 | 4 | 2 | 1 |
|  | Herbal odor | 1 | 1 | 3 | 0 | 0 | 0 | 0 | 3 | 4 |
|  | Lasting feeling of aftertaste | 1 | 1 | 2 | 1 | 1 | 1 | 1 | 2 | 2 |
|  | Viscosity (mPa · s) | 1163 | 1161 | 1174 | 822 | 905 | 1599 | 3000 | 1168 | 1170 |
|  | Average particle diameter (μm) | 17.5 | 16.7 | 16.8 | 41.4 | 24.7 | 6.8 | 4.9 | 17.0 | 16.9 |

TABLE 1-continued

|  | (% by mass) | Comparative Example 1 | Comparative Example 2 | Comparative Example 3 | Comparative Example 4 |
|---|---|---|---|---|---|
| Aqueous phase | Sugar | 13 | 13 | 13 | 13 |
|  | Soy sauce | 22 | 22 | 22 | 22 |
|  | Xanthan gum | 0.06 | 0.06 | 0.06 | 0.06 |
|  | Sodium glutamate | 0.1 | 0.1 | 0.1 | 0.1 |
|  | Gluconic acid | 0.8 | 0.8 | 0.8 | 0.8 |
|  | Sesame | 8.5 | 8.5 | 8.5 | 8.5 |
|  | Shiitake mushroom extract | 0.3 | 0.3 | 0.3 | 0.3 |
|  | Brewed vinegar (acidity 15%) | 3.5 | 3.5 | 3.5 | 3.5 |
|  | Egg yolk (10% salted) | 1.5 | 1.5 | 1.5 | 6 |
|  | Water | Balance | Balance | Balance | Balance |
|  | Rosmarinic acid-containing preparation | — | 0.50 | — | 0.005 |
|  | GSH-containing yeast | — | — | 0.4 | 0.1 |
| Oil phase | Rapeseed oil | 27 | 27 | 27 | 27 |
|  | Fish oil | 3 | 3 | 3 | 3 |
|  | Carnosic acid- and carnosol-containing preparation | — | — | — | — |
|  | Total | 100.0 | 100.0 | 100.0 | 100.0 |
|  | (A1) DHA + EPA (% by mass) | 1.1 | 1.1 | 1.1 | 1.1 |
|  | (A2) α-linolenic acid (% by mass) | 2.5 | 2.5 | 2.5 | 2.5 |
|  | (B) rosmarinic acid (ppm) | 0 | 500 | 0 | 5 |
|  | (C) reduced glutathione (ppm) | 0 | 0 | 40 | 10 |
|  | (D) phospholipid (% by mass) | 0.106 | 0.106 | 0.106 | 0.425 |
|  | Carnosic acid and carnosol (ppm) | 0 | 0 | 0 | 0 |
|  | $\{(B) + (C)\}/(A)(\times 10^{-4})$ | — | — | — | 4.2 |
|  | $\{(B) + (C)\}/(A1)(\times 10^{-4})$ | — | — | — | 13.6 |
|  | $\{(B) + (C)\}/(A2)(\times 10^{-4})$ | — | — | — | 6.0 |
| Evaluation items | Fishy odor | 8 | 3 | 7 | 5 |
|  | Herbal odor | 0 | 8 | 0 | 0 |
|  | Lasting feeling of aftertaste | 0 | 0 | 8 | 1 |
|  | Viscosity (mPa · s) | 1141 | 1125 | 1140 | 3770 |
|  | Average particle diameter (μm) | 17.5 | 17.4 | 16.7 | 4.0 |

Examples 19 to 25 and Comparative Examples 5 to 6

Preparation of Emulsified Liquid Dressing

An emulsified liquid dressing was prepared in the same manner as in Example 1 described above.

Sensory Evaluation and Measurement of Viscosity and Average Particle Diameter

Sensory evaluation was carried out in the same manner as in the method described above, except that the deterioration odor derived from linseed oil was evaluated instead of the "fishy odor". For the "deterioration odor derived from linseed oil", the sensory evaluation of Comparative Example 5 was defined as 8 points (very much felt).

In addition, the viscosity and the average particle diameter were measured in the same manner as in the methods described above.

The results are shown in Table 2.

TABLE 2

|  | (% by mass) | Example 19 | Example 20 | Example 21 | Example 22 | Example 23 | Example 24 | Example 25 | Comparative Example 5 | Comparative Example 6 |
|---|---|---|---|---|---|---|---|---|---|---|
| Aqueous phase | Sugar | 13 | 13 | 13 | 13 | 13 | 13 | 13 | 13 | 13 |
|  | Soy sauce | 22 | 22 | 22 | 22 | 22 | 22 | 22 | 22 | 22 |
|  | Xanthan gum | 0.06 | 0.06 | 0.06 | 0.06 | 0.06 | 0.06 | 0.06 | 0.06 | 0.06 |
|  | Sodium glutamate | 0.1 | 0.1 | 0.1 | 0.1 | 0.1 | 0.1 | 0.1 | 0.1 | 0.1 |
|  | Gluconic acid | 0.8 | 0.8 | 0.8 | 0.8 | 0.8 | 0.8 | 0.8 | 0.8 | 0.8 |

TABLE 2-continued

| (% by mass) | | Example 19 | Example 20 | Example 21 | Example 22 | Example 23 | Example 24 | Example 25 | Comparative Example 5 | Comparative Example 6 |
|---|---|---|---|---|---|---|---|---|---|---|
| | Sesame | 8.5 | 8.5 | 8.5 | 8.5 | 8.5 | 8.5 | 8.5 | 8.5 | 8.5 |
| | Shiitake mushroom extract | 0.3 | 0.3 | 0.3 | 0.3 | 0.3 | 0.3 | 0.3 | 0.3 | 0.3 |
| | Brewed vinegar (acidity 15%) | 3.5 | 3.5 | 3.5 | 3.5 | 3.5 | 3.5 | 3.5 | 3.5 | 3.5 |
| | Egg yolk (10% salted) | 1.5 | 1.5 | 1.5 | 1.5 | 1.5 | 1.5 | 0.1 | 1.5 | 6 |
| | Water | Balance | Balance | Balance | Balance | Balance | Balance | Balance | Balance | Balance |
| | Rosmarinic acid-containing preparation | 0.1 | 0.1 | 0.1 | 0.1 | 0.1 | 0.1 | 0.1 | — | 0.1 |
| | GSH-containing yeast | 0.008 | 0.008 | 0.008 | 0.008 | 0.008 | 0.008 | 0.008 | — | 0.008 |
| Oil phase | Rapeseed oil | 27 | 21 | 15 | 9 | 0 | 0 | 0 | 27 | 0 |
| | Linseed oil | 3 | 9 | 15 | 21 | 30 | 30 | 30 | 3 | 30 |
| | Carnosic acid- and carnosol-containing preparation | — | — | — | — | — | 0.05 | — | — | — |
| | Total | 100.0 | 100.0 | 100.0 | 100.0 | 100.0 | 100.0 | 100.0 | 100.0 | 100.0 |
| | (A1) DHA + EPA (% by mass) | 0 | 0 | 0 | 0 | 0 | 0 | 0 | 0 | 0 |
| | (A2) α-linolenic acid (% by mass) | 4.2 | 7.1 | 10.0 | 12.9 | 17.3 | 17.3 | 17.3 | 4.2 | 17.3 |
| | (B) rosmarinic acid (ppm) | 100 | 100 | 100 | 100 | 100 | 100 | 100 | 0 | 100 |
| | (C) reduced glutathione (ppm) | 0.8 | 0.8 | 0.8 | 0.8 | 0.8 | 0.8 | 0.8 | 0 | 0.8 |
| | (D) phospholipid (% by mass) | 0.106 | 0.106 | 0.106 | 0.106 | 0.106 | 0.106 | 0.007 | 0.106 | 0.425 |
| | Carnosic acid and carnosol (ppm) | 0 | 0 | 0 | 0 | 0 | 24.3 | 0 | 0 | 0 |
| | {(B) + (C)}/(A2)(×10⁻⁴) | 24.1 | 14.2 | 10.1 | 7.8 | 5.8 | 5.8 | 5.8 | — | 5.8 |
| Evaluation items | Deterioration odor derived from linseed oil | 0 | 0 | 0 | 1 | 3 | 1 | 3 | 8 | 4 |
| | Herbal odor | 1 | 1 | 1 | 1 | 1 | 2 | 1 | 0 | 1 |
| | Lasting feeling of aftertaste | 0 | 0 | 0 | 0 | 0 | 0 | 0 | 0 | 0 |
| | Viscosity (mPa · s) | 1052 | 1051 | 1057 | 1058 | 1117 | 1110 | 812 | 1050 | 3650 |
| | Average particle diameter (μm) | 10.3 | 10.3 | 9.9 | 9.7 | 10.3 | 9.7 | 43.1 | 9.8 | 4.2 |

As is apparent from Table 1 and Table 2, the products of the present invention, in which rosmarinic acid and reduced glutathione were blended, had a less fishy odor and a less deterioration odor derived from linseed oil and a less herbal odor and also a less lasting feeling of aftertaste after the storage than those of the comparative products. In addition, they maintained viscosity suitable for the use of the emulsified liquid seasonings. The average particle diameters of the emulsified liquid seasonings were all 50 μm or less.

In contrast, for Comparative Examples 1 to 3 and 5, in which rosmarinic acid and reduced glutathione were not blended, with the storage, the taste and flavor deteriorated, the herbal odor was strongly felt, and the aftertaste remained. In addition, Comparative Examples 4 and 6, in which the phospholipid was contained in an amount larger than the predetermined amount, had high viscosity and were difficult to use them as the emulsified liquid seasonings, and the deterioration proceeded to generate the fishy odor and the deterioration odor derived from linseed oil strongly.

The invention claimed is:

1. An emulsified liquid seasoning comprising the following components (A), (B), and (C) blended therein:
   (A) an ω3 fatty acid derived from a fat or oil, in an amount of 3 to 20% by mass;
   (B) rosmarinic acid, wherein an amount of (B) rosmarinic acid blended is from 1 to 400 ppm; and
   (C) reduced glutathione, wherein an amount of (C) reduced glutathione blended is from 0.1 to 30 ppm,
   wherein a mass ratio of a total amount blended of (B) rosmarinic acid and (C) the reduced glutathione to an amount blended of (A) the ω3 fatty acid derived from the fat or oil, [{(B)+(C)}/(A)], is in a range of $1 \times 10^{-4}$ to $100 \times 10^{-4}$,
   wherein (D) a phospholipid is blended in an amount of 0.4% by mass or less in the emulsified liquid seasoning, and
   wherein the pH of the emulsified liquid seasoning is 5.5 or less said pH being adjusted by adding at least one component selected from the group consisting of an acidulant, an organic acid, an inorganic acid, and lemon fruit juice.

2. The emulsified liquid seasoning according to claim 1, wherein said emulsified liquid seasoning has an average particle diameter of 50 μm or less.

3. The emulsified liquid seasoning according to claim 1, wherein the amount of (D) the phospholipid blended is 0.001% by mass to 0.4% by mass.

4. The emulsified liquid seasoning according to claim 1, wherein (A) the ω3 fatty acid derived from the fat or oil comprises one or more selected from the group consisting of α-linolenic acid, eicosapentaenoic acid, and docosahexaenoic acid.

5. The emulsified liquid seasoning according to claim 1, wherein an amount of (B) rosmarinic acid blended is from 10 to 390 ppm.

6. The emulsified liquid seasoning according to claim 1, wherein an amount of (C) the reduced glutathione blended is from 0.5 to 20 ppm.

7. The emulsified liquid seasoning according to claim 4, wherein a total amount blended of (A) eicosapentaenoic acid and docosahexaenoic acid derived from a fat or oil is from 0.1 to 8% by mass.

8. The emulsified liquid seasoning according to claim 4, wherein an amount blended of (A) α-linolenic acid derived from a fat or oil is from 0.1 to 20% by mass.

9. The emulsified liquid seasoning according claim 1, wherein a mass ratio of a total amount blended of (B) rosmarinic acid and (C) the reduced glutathione to an amount blended of (A) the ω3 fatty acid derived from the fat or oil, $[\{(B)+(C)\}/(A)]$, is in a range of $5\times10^{-4}$ to $70\times10^{-4}$.

10. The emulsified liquid seasoning according to claim 1, further comprising from 0.1 to 40 ppm of carnosic acid, carnosol, or a combination thereof.

11. The emulsified liquid seasoning according to claim 1, wherein said emulsified liquid seasoning has a viscosity ranging from 800 mPa·s to 3,500 mPa·s at 20±2° C.

12. A method for producing an emulsified liquid seasoning, the method comprising blending (A) an ω3 fatty acid derived from a fat or oil, (B) rosmarinic acid, and (C) a reduced glutathione, and (D) optionally a phospholipid,
   wherein an amount of (A) blended is from 3 to 20% by mass based on a total mass of all raw materials blended, and an amount of (D) blended is 0.4% by mass or less based on the total mass of all raw materials blended wherein the pH of the emulsified liquid seasoning is 5.5 or less said pH being adjusted by adding at least one component selected from the group consisting of an acidulant, an organic acid, an inorganic acid, and lemon fruit juice.

13. The emulsified liquid seasoning according to claim 1, wherein an amount of (B) rosmarinic acid blended is from 10 ppm to 350 ppm.

14. The emulsified liquid seasoning according to claim 1, wherein when (A) comprises eicosapentaenoic acid and docosahexaenoic acid, an amount of (B) rosmarinic acid blended is from 1 ppm to 300 ppm.

15. The emulsified liquid seasoning according to claim 1, wherein when (A) does not comprise eicosapentaenoic acid and docosahexaenoic acid, an amount of (B) rosmarinic acid blended is from 50 ppm to 150 ppm.

16. The emulsified liquid seasoning according to claim 1, wherein when (A) comprises eicosapentaenoic acid and docosahexaenoic acid, a mass ratio of a total amount blended of (B) rosmarinic acid and (C) the reduced glutathione in the emulsified liquid seasoning to the amount blended of (A) the ω3 fatty acid derived from the fat or oil, in the emulsified liquid seasoning, $[\{(B)+(C)\}/(A)]$, is from $1\times10^{-4}$ to $70\times10^{-4}$.

17. The emulsified liquid seasoning according to claim 1, wherein when (A) comprises eicosapentaenoic acid and docosahexaenoic acid, a mass ratio of the total amount blended of (B) rosmarinic acid and (C) the reduced glutathione in the emulsified liquid seasoning to a total amount blended of (A1) eicosapentaenoic acid and docosahexaenoic acid derived from the fat or oil, in the emulsified liquid seasoning, $[\{(B)+(C)\}/(A1)]$, is from $5\times10^{-4}$ to $200\times10^{-4}$.

18. The emulsified liquid seasoning according to claim 1, wherein when (A) comprises eicosapentaenoic acid and docosahexaenoic acid, a mass ratio of the total amount blended of (B) rosmarinic acid and (C) the reduced glutathione in the emulsified liquid seasoning to an amount blended of (A2) α-linolenic acid derived from the fat or oil, in the emulsified liquid seasoning, $[\{(B)+(C)\}/(A2)]$, is from $3\times10^{-4}$ to $250\times10^{-4}$.

19. The emulsified liquid seasoning according to claim 1, wherein when (A) does not comprise eicosapentaenoic acid and docosahexaenoic acid, a mass ratio of the total amount blended of (B) rosmarinic acid and (C) the reduced glutathione in the emulsified liquid seasoning to the amount blended of (A) the ω3 fatty acid derived from the fat or oil, in the emulsified liquid seasoning, $[\{(B)+(C)\}/(A)]$, is from $5\times10^{-4}$ to $25\times10^{-4}$.

20. The emulsified liquid seasoning according to claim 1, wherein the pH of the emulsified liquid seasoning is 2.5 to 5.5.

21. The emulsified liquid seasoning according to claim 1, wherein the pH of the emulsified liquid seasoning is 3 to 5.

22. The emulsified liquid seasoning according to claim 1, wherein the pH of the emulsified liquid seasoning is 3.2 to 4.5.

* * * * *